Aug. 7, 1928.
E. R. SNOOK
1,679,842
SHOCK ABSORBER
Filed June 4, 1925   3 Sheets-Sheet 1
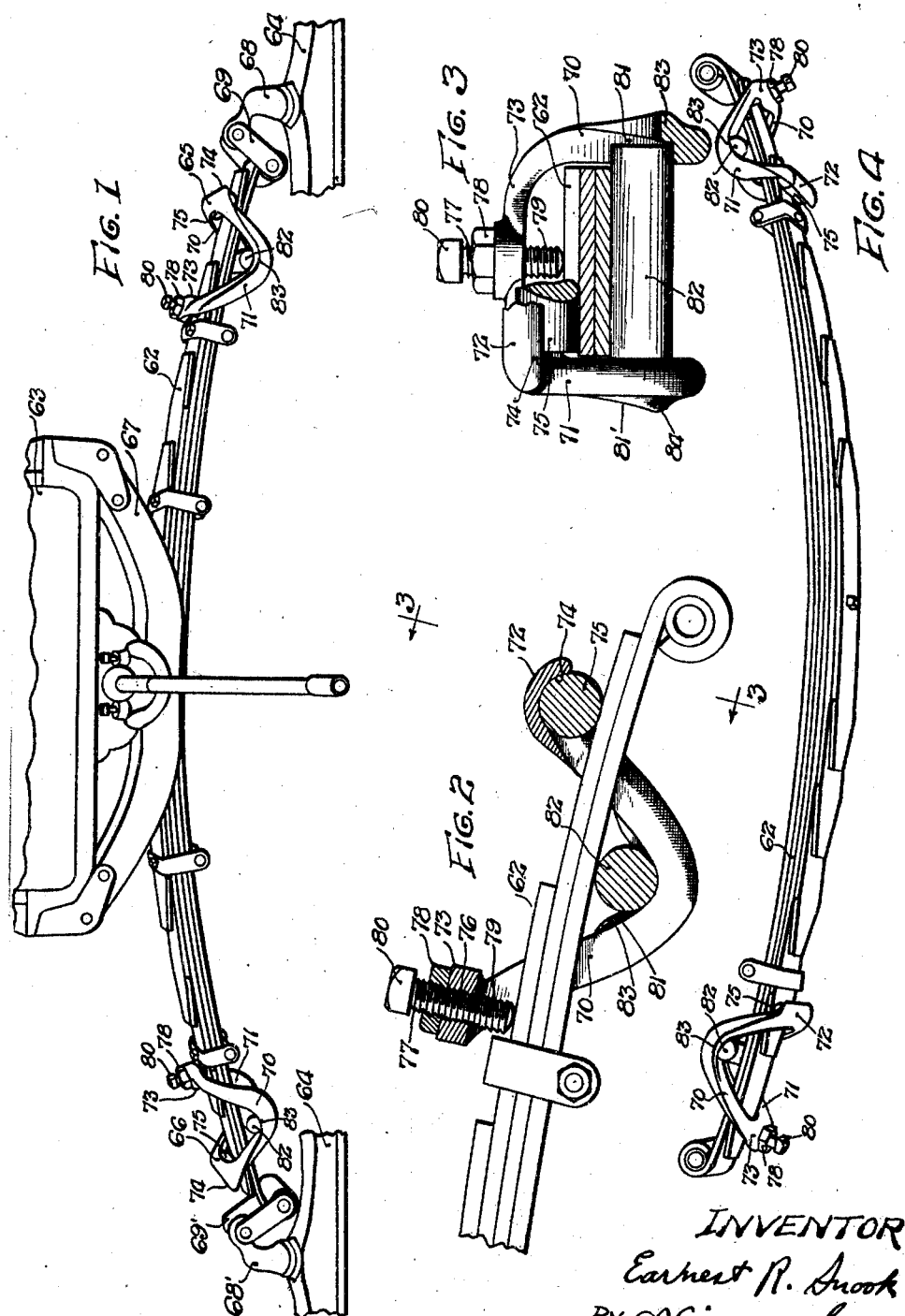
INVENTOR:
Earnest R. Snook
By Nissen & Crane
ATTYS.

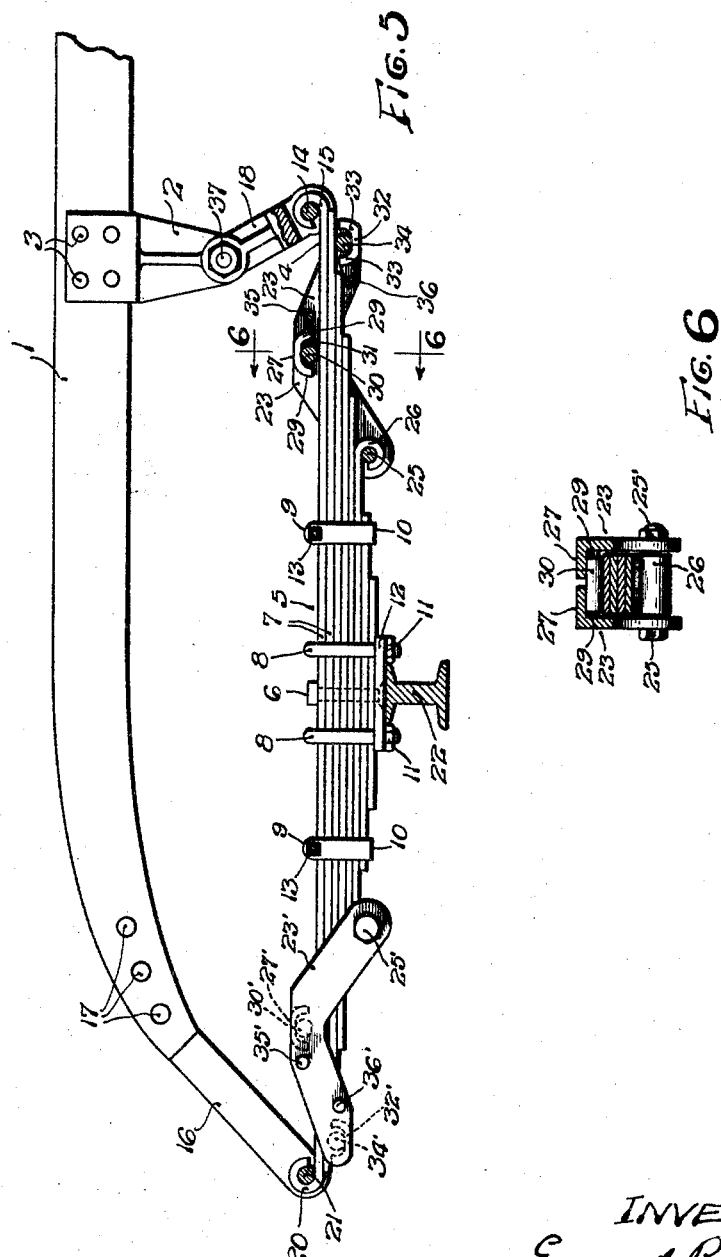

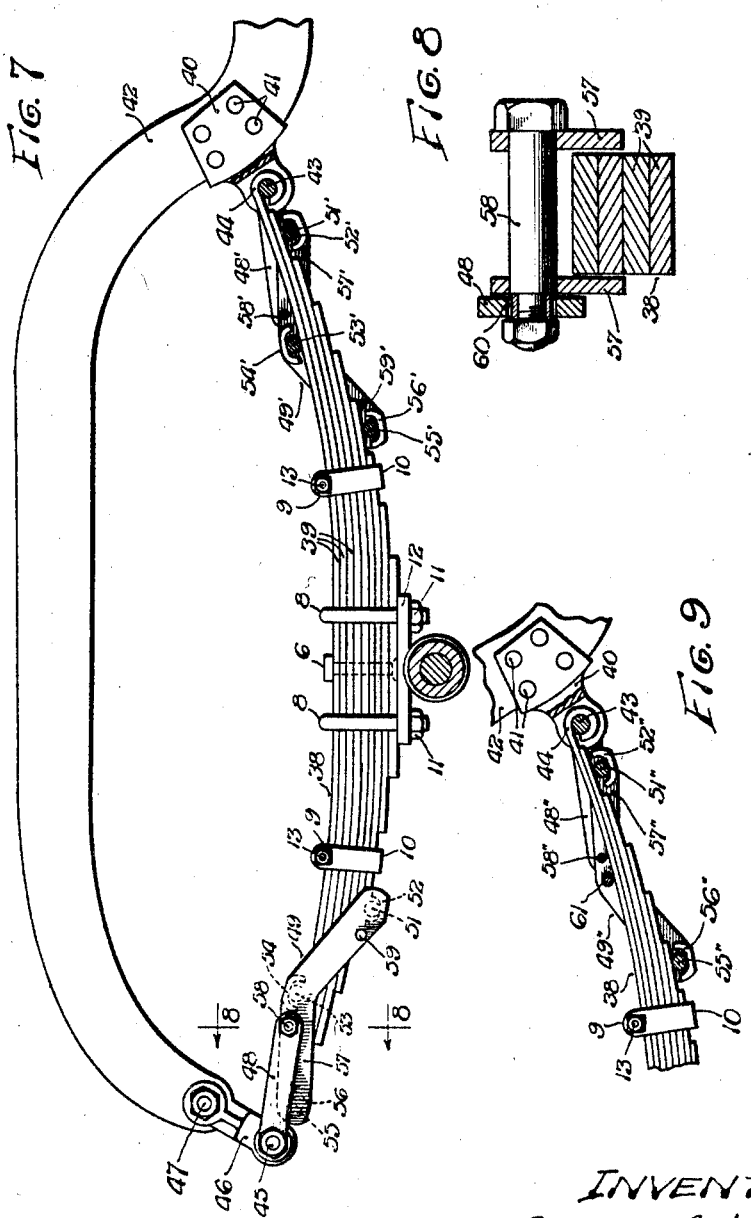

Patented Aug. 7, 1928.

1,679,842

UNITED STATES PATENT OFFICE.

EARNEST R. SNOOK, OF DAVENPORT, IOWA, ASSIGNOR TO STARKWEATHER-SNOOK CORPORATION, OF MOLINE, ILLINOIS, A CORPORATION OF IOWA.

SHOCK ABSORBER.

Application filed June 4, 1925. Serial No. 34,776.

My invention relates to shock absorbers for vehicle springs and has for one of its objects the provision of a simple and efficient device of this character.

Another object of the invention is the provision of shock absorbing means that can be easily and quickly applied to the springs of a vehicle without requiring the removal of any parts thereof.

A further object of my invention is the provision of shock absorbing means that may be adjusted in accordance with the weight and load of a vehicle.

A still further object of my invention is the provision of shock absorbing means for modifying the action of the usual vehicle spring, without adding any supplemental spring, to produce the desired result.

Other objects will appear hereinafter, the novel features and combinations being more clearly set forth in the appended claims.

In the drawings:—

Fig. 1 is a perspective view of a vehicle spring equipped with a shock absorber embodying my invention;

Fig. 2 is a perspective view of a fragment of a spring showing a longitudinal sectional view of a shock absorber embodying my invention;

Fig. 3 is a sectional view of a shock absorber taken on line 3—3 of Fig. 2 looking in the direction of the arrows;

Fig. 4 is a perspective view of a vehicle spring equipped with my improved shock absorbing device which is applied thereto in a different relation from that disclosed in Fig. 1;

Fig. 5 is a side view of a front vehicle spring equipped with a modified form of shock absorber embodying my invention;

Fig. 6 is a sectional view taken on line 6—6 of Fig. 5;

Fig. 7 is a side view of a rear vehicle spring equipped with a shock absorber embodying my invention;

Fig. 8 is a sectional view taken on line 8—8 of Fig. 7; and

Fig. 9 is a side view of a part of a vehicle spring equipped with a modified form of my invention.

Referring more particularly to Fig. 1 of the drawings, it will be seen that a front vehicle leaf spring 62 is mounted at its middle portion on a vehicle 63 and at its ends on the front axle 64 of the vehicle. Shock absorbing devices 65 and 66 are shown secured to the spring 62 at each end of the spring. The spring is secured to the vehicle 63 and to the axle 64 in the usual manner by means of the rigid frame or bracket 67 and the pivotal mountings at the ends comprising the link and post connection 68 and 69 at one end and the link and post connection 68' and 69' at the other.

The spring stabilizers or shock absorbers 65 and 66 comprise a unitary, bifurcated, angular frame-work having side members 70 and 71, as shown in Figs. 2 and 3, which depend downwardly adjacent opposite sides of the spring 62. This frame-work or bifurcated angular lever is preferably formed by the process of drop forging and must comprise material such as will apply the required force without being stretched or deformed beyond its elastic limit. In other words, the metal used must have sufficient ductility to permit a limited amount of flexure and sufficient strength so that it will resume its original shape and form after each application of force.

The novel construction of the stabilizing device is clearly shown in Figs. 2 and 3. Each side member 70 and 71 is substantially V-shaped in form and these side members are connected together at both ends as shown in Figs. 1, 3 and 4. The end portions 72 and 73 are made integral with the side members 70 and 71 so that the framework as already described comprises a unitary bifurcated angular lever. The lower side of the end portion 72 is formed concave to provide a socket 74 for a roller 75 which is disposed between the spring 62 and the end member 72.

The roller 75 rests against the upper surface of one of the leaves of the spring 62 and is retained in the socket in a manner hereinafter disclosed.

The other end 73 of the bifurcated angular framework is provided with an opening 76 which is screw-threaded to receive a set screw 77. A lock nut 78 is screw-threaded onto the set screw 77 above the end member 73 for the purpose of securing the set screw in its adjusted position. The lower end 79 of the set screw 77 extends entirely through the end member 73 and engages the upper surface of one of the leaves of the spring 62. The head 80 of the set screw 77 is disposed above the end member 73 in a position to permit free and easy adjustment of the set screw.

In the elbows of each of the V-shaped side members 70 and 71 sockets 81 and 81' are provided to receive the ends of a roller 82. These sockets, as shown in Fig. 3 are formed in the side members 70 and 71 which are provided with flanges 83 and 84 to abut against the ends of the roller to prevent lateral movement of the latter. The roller 82 is journaled at one end in the socket 81 of the elbow of the side member 70 and at the other end in a similar socket 81' in the elbow of the side member 71.

When the device is to be attached to a vehicle spring, the rollers 75 and 82 are removed from their respective sockets and the set screw 77 is partially withdrawn from the opening 76 so that the cross piece 73 may be free to engage the top of the spring 62. When the set screw has been thus adjusted the device may be positioned to straddle the spring with the end cross members 72 and 73 resting on the upper surface of the spring. With the device in this position there is ample clearance between the lowermost surface of the spring 62 and the V-shaped portion of the side members 70 and 71 to permit the roller 82 to be placed under the spring with its ends resting respectively in the sockets 81 and 81'. The end portion 72 may then be lifted until the roller 82 engages the lowermost surface of the spring 62 and this movement will provide sufficient clearance for the roller 75 to be inserted in its socket 74 below the end member 72.

With the two rollers 82 and 75 held in the position described, the set screw 77 may be screwed down tightly against the upper surface of one of the leaves of the spring 62 and thereby press the rollers 82 and 75 against the spring 62. The lock nut 78 may then be relied on to hold the set screw in adjusted position.

In the illustration shown in the drawings, the roller 75 rests upon the upper surface of the second leaf from the bottom of the spring and the end of the set screw 77 presses against the third leaf from the bottom of the spring. This particular relationship is disclosed for illustrative purposes only, it being understood that the arrangement may be varied to meet the particular construction and size of the spring. In any event, however, there must be more than one leaf between the lower roller 82 and the upper contact members 77 and 75 to enable the apparatus to operate with maximum efficiency.

As shown in Fig. 4 the stabilizing devices are adapted to a reverse position relative to that shown in Fig. 1. The device will function properly with the end having the adjustable set screw therein disposed inwardly with respect to the ends of the spring as shown in Fig. 1 or adjacent the ends of the spring as shown in Fig. 4. The spring to which the stabilizing device is applied may be of the convex downwardly disposed form as shown in Fig. 1 or of the concave upwardly disposed type shown in Fig. 4. It should be understood that with each of these forms the elbow roller of the stabilizer is positioned adjacent that surface of the spring which is closest to the center of curvature thereof. In each case the mode of operation is substantially the same and the results are equally as satisfactory.

It should be understood that the bracket or bifurcated angular lever is integral throughout and that it is preferably formed by the method of drop forging. This integral structure is designed to retain the contacting rollers in proper position without relying on any part of the vehicle other than the leaf spring. The stabilizers are adapted to be clamped onto the end portions of the leaf springs without necessitating the removal of the spring from the vehicle and after being clamped in position they are self-sustaining. In other words, each stabilizer may be placed on a vehicle leaf spring while the vehicle is completely assembled with such leaf spring secured to its attachments, so that the elbow portion of each of the arms of the stabilizer extend from the inside of the leaf spring toward the center of curvature thereof. It should also be noted that at any time the set screw 77 may be tightened or loosened and by means of the nut 78 locked in adjusted position. The stabilizer may be also quickly detached at any time.

The stabilizing devices have been found to operate most efficiently and satisfactorily when they are positioned symmetrically with respect to the ends of the leaf spring. When a symmetric arrangement exists the same leaves of the spring are clamped at each end in a similar manner. Since the stabilizers at the end portions of the leaf spring are adjustable the desired symmetrical arrangement may readily be secured.

In operation the stabilizer functions to cause the leaves of the spring to be pressed tightly together so as to increase the sliding friction between the leaves thereof. The pressure upon the leaves of the spring is increased in accordance with the weight of the vehicle and thus the pressure varies in proportion with the flexure of the spring caused by the weight supported thereon. It will be seen by referring to Fig. 1 that as the center of the spring which is positioned under the body of the vehicle, moves downwardly the spring bends and tends to straighten out. The leaves of the spring thus tend to slide one upon the other. This bending of the spring and such sliding movement are rendered more difficult by the stabilizing device and thus the center of the spring can not bend down to the axle of the vehicle under the usual force applied. As a result of the friction developed between the leaves of the spring, the leaf spring is in effect stiffened and only a limited amount of flexure is permitted.

The pressure exerted upon the leaves of the spring results from the automatic clamping action of the stabilizer including the contacting rollers and the set screw 77. The forces tending to bend the spring are not constant and uniform but vary considerably. The greater such forces the greater the clamping action of each stabilizer. That is, the more the leaf spring is bent the more firmly will each stabilizer grip the leaves of the spring to increase the friction between them. When the wheels of a vehicle to which such devices are attached run into a hole in a road, the body tends to follow and project its entire weight downwardly with a terrific force or shock. As the center or middle portion of the spring bends downwardly under this force each stabilizer including its contacting rollers and the set screw acts to resist bending and straightening out of the leaf spring. This action causes the spring to become more rigid and to develop an increased force of friction between the leaves. As a result of the incresed rigidity of the spring a greater force resists the downward movement of the vehicle body and this force is incresed gradually as the spring bends.

The greater increase in the rigidity of the spring causes a cushioning action to take place that brings the body of the vehicle to rest without shock or jar. The downward movement of the body is not stopped abruptly but is slowed down gradually as the spring bends until the downward thrust of the vehicle body is completely counteracted. For this reason the recoil or rebound of the body is not severe. As the spring returns to its normal position the pressure between the leaves is gradually decreased.

The extent to which the body rebounds is dependent upon the degree of distortion suffered by the spring during the downward movement of the frame and body. Thus, as explained, a vehicle spring equipped with the stabilizing devices disclosed is not permitted a large freedom of downward movement and as a result the recoil is small in proportion. In other words, the stabilizer is capable of reducing the recoil by removing the cause thereof.

Figs. 5 to 9, inclusive, disclose a modified form of my invention.

Referring more particularly to Fig. 5 of the drawings, it will be seen that a frame 1 of a vehicle is shown having a bracket 2 secured thereto by means of bolts or rivets 3. In the structure illustrated in Fig. 5 the bracket 2 is attached at a desirable point near the forward end of the vehicle so as to be in a position to support the rear end 4 of a front spring 5. The front spring 5 comprises a plurality of superimposed spring leaves 7 held in superimposed position by a stud bolt 6, a pair of inverted U-shaped brackets 8, 8 and upright U-shaped brackets 10, 10, there being a plate 12 positioned adjacent the under side of the lowermost leaf 7 to cooperate with the inverted U-shaped brackets 8, 8 and with the stud bolt 6 in retaining the leaves 7 in a fixed position. The plate 12 is provided with a threaded opening in the central portion thereof to accommodate the stud bolt. Each end of the plate 12 is provided with two openings or holes to receive the threaded ends of the inverted U-shaped brackets or braces 8, 8, there being a nut 11 screw-threaded onto each of the four ends of the braces and against the lowermost surface of the plate. The upright U-shaped brackets or braces 9, 9 are provided near their upper ends with bolts 13, 13 which when tightened cause the braces 9, 9 to exert a clamping force on the spring leaves 7. As shown in Fig. 5, the plate 12 rests upon the axle 22 of the vehicle.

The rear end 4 of the uppermost leaf member of the spring 5 is disposed in a substantially closed loop 15 which is pivotally journaled on a stud bolt 14 on the lower end of a link member 18. The upper end of the link member 18 is journaled on a stud or bolt 37 which is secured to the lowermost portion of the bracket 2. The front end of the uppermost leaf of the spring 5 is likewise disposed in a substantially closed loop 20 which is journaled on a stud bolt 21 on the end of the frame extension 16. The frame extension 16 is secured to the frame part 1 by bolts or rivets 17.

Spring stabilizing devices are shown in Fig. 5 mounted on each end of the spring 5. It should be understood that the spring stabilizing devices may be mounted in a similar manner on springs of different construction than that shown in the drawings, the particular illustration being used to show the method of operation of the stabilizer. Each stabilizer comprises parallel plate members 23, 23, one positioned on each side of the leaf spring members 7 and secured together by bolts 35 and 36. The lowermost ends of the angle plates 23, 23 are journaled on a short shaft or bolt 25 which passes through a loop 26 at the extreme end of one of the leaf members 7. After the nut is put in place the end 25′ shown in Fig. 6 may be peened over.

In the illustration shown in Fig. 5 the third leaf from the bottom of the spring 5 is disposed downwardly in a substantially closed loop 26 similar to the loop 15 on the uppermost leaf member. It should be understood that the angle plates 23 may be journaled at the end of the most conveniently located leaf member; the third leaf from the bottom has been chosen for illustrative purposes. The positions of the lowermost ends of the angle plates 23, 23 determine the rigidity of the stabilizing device and thus the device may be attached in such a manner as to correspond to the weight of the particular vehicle upon which it is mounted. It should also be understood that the angle plates 23, 23 are free to rotate relatively to the loop 26.

As shown in Figs. 5 and 6, inwardly projecting flanges 27 are made integral respectively with the angle plates 23, 23 and are located at the uppermost portions of said plates. Ears 29, 29 are disposed downwardly along both lateral edges of the flanges 27, 27 to a position slightly above the upper surface the top spring leaf member to form pockets. In Figs. 5 and 6 it will be seen that the angle plate 23, the flange 27 and the downwardly disposed ears 29, 29 form a partial enclosure 31 or pocket for a roller 30. The roller 30 rests upon the upper surface of the top spring leaf and has a slight freedom of lateral movement within the enclosures or pockets 31. A similar pair of enclosures or pockets at the extreme rear end of the angular plate members are provided by said angular plates 23, 23, ears 33, 33 and a flange 32. A roller 34 is substantially enclosed in said enclosure and is adapted to contact with the under side of one of the leaf springs. Bolts may be provided, as indicated at 35 and 36, to hold the plates 23 and the pockets 31 in proper positions. At the forward end of the spring 5 a stabilizer is connected to a leaf 7 and comprises the parts 23', 27', 30', 32', 34', 35' and 36'.

The operation of the stabilizing device will be best understood by tracing the movement of the several moving parts that would be set in motion if a vehicle equipped with the device were driven over rough roads. Assuming that a comparatively heavy vehicle body is supported by the frame 1, it will be seen that there is considerable weight upon the spring 5. When the vehicle wheels strike an irregularity in the road the weight of the body would be projected upwardly or downwardly relative to the spring ends and thus cause flexion of the springs, the amount of flexion in the springs depending upon the strength of the springs and the force of the impact thereon. Flexible springs are required to absorb small amounts of impact or shock, whereas rigid, strong springs are required to absorb severe impact or shock. Thus it is necessary that a satisfactory vehicle spring be flexible enough to absorb slight amounts of impact and yet rigid enough to absorb severe shock and to prevent the framework from striking the axles.

The spring stabilizer disclosed is adapted to vary the effective length of the spring so as to permit a long flexible portion to be in operative engagement when only slight amounts of shock or impact are applied and to shorten the effective length so as to permit the rigid portions of said spring to be effective when large loads or amounts of impact are applied thereto.

In addition to the shock absorbing effect produced by changing the effective length of the spring, the stabilizer also compresses the leaves of the spring together with such a force as to prevent sliding of one leaf relative to another. This extreme friction, due to the increased force holding the leaves together, causes the entire spring to be rigid and to bend but slightly under large loads.

In Fig. 5 is will be seen that when a force is applied on the rear end of the spring, for example, the free end of the angular lever member 23 tends to move downwardly while the other end remains pivotally fixed at 25. The roller 30, resting against the uppermost leaf, tends to prevent the downward movement of the free end of the angular lever and thus exerts a force upon the spring which compresses the leaves thereof together. It should be understood that the force exerted by the roller 30 is applied at a point relatively close to the pivoted end or fulcrum of the lever and for this reason the force is greater in magnitude than the force applied upon the end of the spring.

When the axle falls due to the wheels passing into a hole or depression in the road, the above-described action is reversed. The fixed end of the lever moves downwardly and the free end thereof exerts an upward force which tends to separate the leaves of the spring and thus reduces the friction therebetween. This reduction in friction causes the spring to be less rigid and prevents excessive shock and vibration from being transmitted from the wheels to the frame and body of the vehicle.

By referring to Fig. 5 it will be seen that when the axle 22 is suddenly moved upwardly as by means of a hump on the road the effective length of the spring will be shortened and the spring will therefore be stiffened to more effectively resist such upward movement. Consequently the recoil of the body of the vehicle will be lessened accordingly. When the recoil does take place the effective length of the spring will also be shortened and by reason of this stiffening of the spring such downward recoil may be checked. The same is true when the wheels suddenly enter a depression on the road. The axle 22 will be permitted to move down freely by reason of the full length of the spring being in action. But when a downward following movement of the vehicle body begins by action on the ends of the spring the effective length of the spring will be shortened to check such downward movement and also the upward movement of the axle out of the depression on the road. Substantially the same operation takes place in connection with the construction shown in either Fig. 7 or Fig. 9. It will thus be seen that the stabilizer above described is an effective shock absorber.

Figs. 7 and 8 show an embodiment of the stabilizer mounted on a rear spring of a vehicle. The spring 38, comprising leaf members 39, is curved upwardly at its end portions and is provided with U-shaped clamps 9, 9 and U-shaped braces 8, 8 similar to those fully described in connection with Figs. 5 and 6. The spring 38 is of the usual construction and is pivotally mounted at its forward end on a bracket 40 which is secured by bolts or rivets 41 to a frame 42. The uppermost leaf of the spring 38 is coiled downwardly at its forward end to form a substantially closed loop 44 which is journaled on a stud or bolt 43 secured to the bracket 40. The rear end of the spring 38 is journaled on a bolt 45 which passes through an opening in the lowermost end of a link 46, there being a loop similar to the loop 44 at the rear end of the uppermost leaf of the spring 38. A bolt 47 passes through an opening in the upper end of the link 46 and through an opening at the extreme rear end of the frame 42. The link 46 is pivotally connected by means of the bolt 47 to the extreme rear end of the frame 42.

A plate or lever 48 is pivotally connected to the bolt 45 and extends forward to the middle portion of a stabilizing device 49 where it is pivotally secured to said stabilizing device by means of a nut and bolt 58. The stabilizing device 49 is similar to the stabilizing device disclosed in Figs. 5 and 6 with the exception that it is in no way anchored directly to the spring 38; the plate 48 is provided to limit the amount of movement of the stabilizing device 48 with respect to the spring 38. The lower end of the stabilizer in place of being journaled on the end of one of the leaf members of the spring is provided with a roller 51 fitting in a pair of pockets 52.

The stabilizing device 49 comprises angle plates 57, 57 secured together by bolts 58 and 59 and provided with pockets 52, 54 and 56 adapted to receive and retain the rollers 51, 53 and 55, respectively. Rollers 51 and 55 engage the lower surface of the spring 38 and the roller 53 rests upon the upper surface thereof. The operation of the stabilizing device disclosed in Figs. 7 and 8 is similar to that of the device shown in Figs. 5 and 6 with the exception that movement of the stabilizer 49 is limited by the pivotally mounted plate or lever 48, whereas the stabilizer shown in Figs. 5 and 6 is secured at its lower end directly to the spring. At the forward end of the spring 38 the stabilizer 49' is connected by the link 48' to the bolt 43, and comprises the parts 51', 52', 53', 54', 55', 56', 57', 58' and 59'.

Fig. 9 shows the bolt 58'' connecting the two angle plates 57'', 57'' with the lever or plate 48'' journaled on a bushing or ring 60 mounted on the outside of one of the plates 57. The bushing 60 is longer than the thickness of the plate 48'' which will permit tension to be applied on the plates 57'', 57'' by the bolt 58'' without preventing the free movement of the lever 48''. After the nut is adjusted on the bolt the end of the latter may be peened over adjacent the nut to prevent the latter from coming off.

A modification of the stabilizer is shown in Fig. 9 wherein the top roller of the stabilizer 49'' is replaced by a bolt 61. In this construction sliding engagement exists between the bolt 61 and the upper surface of the top leaf of the spring 38. Otherwise the construction of the device in Fig. 9 is the same as that described in connection with Figs. 7 and 8, in that it includes the parts 51'', 52'', 53'', 56'', 57'', 58'' connected by the link 48'' to the bolt 43.

Obviously those skilled in the art may make various changes in the details and arrangement of parts without departing from the spirit and scope of the invention defined by the claims hereto appended, and it is therefore desired not to be restricted to the precise construction herein disclosed.

Having thus fully described and shown an embodiment of the invention, what is desired to be secured by Letters Patent of the United States is:

1. A stabilizer for vehicle springs, comprising adjustable bearing means at one end for engaging one side of a vehicle spring, a roller bearing at the other end for engaging the same side of said spring, and means for engaging an intermediate point of the other side of said spring.

2. A stabilizer for vehicle springs, comprising means located at its ends for engaging one side of a vehicle spring at spaced-apart points, and means intermediate its ends for engaging the other side of the spring, one of said end engaging means being adjustable to force said intermediate engaging means against the spring.

3. A stabilizer for vehicle leaf springs, comprising a metal frame-work, means for engaging a spring rotatively mounted on one end of said frame-work, an adjustable abutment on the other end of said frame-work, and means for engaging the spring positioned intermediate the ends of the frame-work and adjacent the surface of said spring opposite from the aforesaid engaging means, said adjustable means being adapted to clamp the leaves of said spring together.

4. The combination with a vehicle leaf spring, of a stabilizing device comprising a bifurcated angular lever having joined ends, a socket disposed at one end of said angular lever, a socket in said lever at the angle part thereof, an adjustable contact at the other end of said lever, and rollers rotatively mounted in said sockets adjacent opposite sides of said spring, said adjustable contact being adapted to exert a force on said spring to press the leaves thereof together between said rollers and said contact.

5. The combination with a vehicle leaf spring, of a stabilizer comprising angular arms connected together at their ends, a socket member in one end connection, an adjustable contact member in the other end connection, a socket in each of the angular arms at the angle part thereof, rollers disposed in said sockets adjacent opposite sides of said spring, and a locking means on said adjustable contact member to retain the latter in a fixed tightened position for exerting pressure on said spring to increase the rigidity of the same.

6. The combination with a vehicle leaf spring, of a bifurcated angular bracket having an arm disposed on each side of said spring and extending in advance of both sides thereof, a contact member journaled at one end of said bracket adjacent one side of said spring, a contact member journaled at the angle portion of said arms adjacent the other side of said spring, and a pressure member on the other end of said bracket adapted to bear upon said spring to clamp a portion thereof between the contact members of said bracket for increasing the rigidity of said spring.

7. A stabilizer for vehicle leaf springs, comprising a bifurcated bracket having angular arms extending in advance of the upper and lower sides of said spring, a socket in the angle part of each of said arms, a roller having its end portions disposed in said sockets, and an adjustable means to position said sockets apart from said spring to permit insertion of the ends of said roller in said sockets.

8. A shock absorber for vehicle leaf springs, comprising a bifurcated angular lever secured to said spring independent of said vehicle, a contact member secured to one end of said lever adjacent the end of said spring, means near the other end of said lever for bearing against the spring, and a contact member positioned adjacent the opposite side of said spring intermediate the ends of said lever, said contact members being adapted to clamp the leaves of said spring together when the middle portion of said spring bends under load.

9. A shock absorber for vehicle leaf springs, comprising a bifurcated angular bracket clamped on said spring near one end thereof, an adjustable means on one end of said bracket for applying pressure upon the leaves of said spring to increase the force of friction therebetween, and means intermediate the ends of said bracket to force the leaves of said spring tightly together when the middle portion of the spring bends under the weight of the vehicle.

10. A spring stabilizer for vehicle leaf springs, comprising a bracket having means at each end for engaging one side of said spring and means intermediate said ends for engaging the other side of said spring, one end engaging means being adjustable to clamp said bracket on said spring and to produce curvature near the ends thereof for increasing the initial rigidity of the spring.

11. A spring stabilizer for vehicle springs, comprising a bracket having abutments at each end for engaging one side of a spring and an abutment intermediate said ends for at the same time engaging the other side of said spring, said abutments being in spaced relation and positioned to produce a reverse curvature near the end of said spring as the middle portion thereof is bent under load or shock.

12. A spring stabilizer for vehicle leaf springs, comprising an angular bracket having spaced apart arms positioned one on each side of said spring and extending in advance of both upper and lower surface thereof, contact members on each end of said bracket for engaging one side of said spring, and an abutment at the angle part of said bracket for engaging the other side of said spring, one of said end abutments being adjustably screw-threaded into said bracket to produce a curvature in said spring between the ends of said bracket when said adjustable abutment is tightened.

13. The combination with a vehicle leaf spring, of a stabilizing device comprising a bracket having a roller journaled at one end in position to engage the upper surface of a leaf of said spring, a roller journaled in said bracket intermediate the ends of the latter and contacting with the lower surface of said spring, and a set bolt having a lock nut thereon screw threaded in the other end of said bracket contacting with the upper surface of a different leaf of said spring, said set bolt being adapted to be tightened to produce a reverse curvature near the ends of said spring to increase the rigidity of the same.

14. The combination of a vehicle leaf spring, and a rigid shock absorber clamped onto said spring adjacent one end thereof and adapted to compress the leaves of said spring together with a force that increases in proportion with the intensity of the shock received by said spring.

15. The combination of a vehicle leaf spring, and a rigid shock absorber clamped onto said spring adjacent the ends thereof and adapted to compress the leaves of said spring together with a force that increases in proportion with the intensity of the shock received by said spring.

16. The combination of a vehicle leaf spring, and a rigid shock absorber clamped onto said spring adjacent the ends thereof and adapted to increase the rigidity of said spring in proportion to the shock received thereby.

17. A stabilizer for vehicle springs, comprising rigid means for engaging at spaced-apart points one side of the vehicle spring, and rigid means for engaging an intermediate point at the other side of the vehicle spring.

18. The combination with a vehicle spring, of a leaf spring therefor, a stabilizer embracing said spring for sole support thereby independently of said frame and for operation solely by flexure of said spring to shorten the effective length of the latter when said spring is subjected to severe shock and to thereby reduce recoil from such shock, and means for preventing movement of the stabilizer longitudinally of the spring from its predetermined position in association with said spring.

19. The combination of a vehicle leaf spring normally occupying a curved position at one of its end portions, and a stabilizer associated with such curved portion of said spring and comprising spaced-apart abutments on one side of said spring and an intermediate abutment on the other side thereof, said abutments being in contact with the spring under normal load and being automatically tightened against the spring increasing the frictional engagement between the leaves of the spring when it tends to straighten out under abnormal load.

20. The combination of a vehicle leaf spring the leaves of which always remain in frictional engagement with each other, and a double elbow clamp closely fitting the spring when in normal position and comprising spaced-apart abutments on one side of said spring and an intermediate abutment on the other side of said spring, said abutments always being in engagement with the spring and exerting increased pressure thereon automatically to increase the friction between the adjacent leaves when the spring is bent from its normal position by abnormal loads.

21. Shock absorbing mechanism adapted to be connected to the leaf spring of a vehicle, comprising a pair of side members connected together to form a rigid frame adapted to embrace such leaf spring, and three abutments for said frame, one intermediate the ends thereof to serve as the only abutment on one surface of the spring, and the other two abutments at the ends of the spring to serve as the only abutments on the other side of the spring.

22. The combination of a vehicle frame, an axle, a leaf spring supporting said frame upon said axle, and a stabilizer for said spring secured adjacent to but spaced from one end thereof and supported thereon independently of said frame and axle in position to compress a plurality of leaves of the spring together with an increasing force upon flexure of the spring under load, said stabilizer having a pair of contact bearings engaging one side of the spring at longitudinally spaced points and a single contact bearing engaging the opposite side of the spring and located at a point longitudinally intermediate the spaced points.

23. A stabilizer for a vehicle leaf spring comprising a pair of contact bearings engaging the convex side of the spring at longitudinally spaced points and a single contact bearing engaging the concave side of the spring and located at a point longitudinally intermediate the spaced points to place the spring leaves between the contact bearings under a predetermined pressure when the spring is in normal position.

24. The combination of a vehicle frame, an axle, a leaf spring supporting said frame upon said axle and a stabilizer for said spring operating independently of said frame and axle to compress a plurality of the leaves of the spring together with an increasing force upon flexure of the spring, said stabilizer having a pair of contact bearings engaging one side of the spring at longitudinally spaced points and a single contact bearing engaging the opposite side of the spring and located at a point longitudinally intermediate the spaced points, one of the contact bearings being adjustable to place the spring leaves between the contact bearings under a predetermined pressure when the spring is in normal position.

25. A stabilizer for a vehicle leaf spring operating to compress a plurality of the leaves of the spring together with an increasing force upon flexure of the spring, said stabilizer comprising a pair of contact bearings engaging the convex side of the spring at longitudinally spaced points and a single contact bearing engaging the concave side of the spring at a point longitudinally intermediate the spaced points, one of the contact bearings being adjustable to place the spring leaves between the contact bearings under a predetermined pressure when the spring is in normal position.

26. A stabilizer for a vehicle leaf spring operating to compress a plurality of the leaves of the spring together with an increasing force upon flexure of the spring, said stabilizer comprising a device secured to the spring and having a pair of contact bearings engaging the convex side of the spring at longitudinally spaced points and a single contact bearing engaging the concave side of the spring at a point longitudinally intermediate the spaced points, one of the contact bearings being adjustable to place the spring leaves between the contact bearings under a predetermined pressure when the spring is in normal position and one of the contact bearings having a greater frictional engagement with the spring than the other contact bearings to secure the last mentioned contact bearing from longitudinal displacement upon the spring.

27. A stabilizer for a vehicle leaf spring comprising a device clamped on the spring and including a pair of contact bearings engaging one side of the spring at longitudinally spaced points and a single contact bearing engaging the opposite side of the spring and located at a point longitudinally intermediate the spaced points, one of the contact bearings including a roller and one a set screw adjustable to place the spring leaves clamped between the contact bearings under a predetermined pressure when the spring is in normal position.

28. A stabilizer for vehicle leaf springs including a pair of contact bearings engaging corresponding sides of a pair of spring leaves at longitudinally spaced points of the spring and a single contact bearing engaging the spring leaf at the opposite side of the spring at a point intermediate the spaced points, one of the contact bearings being adjustable to place the leaves between the contact bearings under predetermined pressure when the spring is in normal position.

29. A shock absorber for springs including a rigid frame having spaced apart angular arms, means at the ends of said arms for contacting with one side of said spring and means at the angle of said arms for contacting with the other side of said spring, one of said contacting means being adjustable to place the spring leaves embraced by said shock absorber under a predetermined pressure when the spring is in normal position.

30. A stabilizer for a vehicle leaf spring, comprising a device secured to an auxiliary leaf of the spring for holding the device from movement longitudinally of the spring, said device having a pair of contact bearings for respectively engaging different auxiliary leaves of the spring, and a single contact bearing intermediate said pair of contact bearings and opposed thereto for engaging the main leaf of the spring.

31. A stabilizer for a vehicle leaf spring, comprising a device secured at one end to an auxiliary leaf of the spring, said device having a pair of contact bearings at its ends for respectively engaging different auxiliary leaves of the spring, and a single contact bearing intermediate its ends and opposed to said pair of contact bearings for engaging the main leaf of the spring.

32. A stabilizer for vehicle leaf springs, comprising a frame adapted to embrace the leaf spring, means at the ends of such frame for engaging at spaced-apart points the lower side of the spring, and means intermediate the ends of said frame for engaging the upper side of the spring while all of the leaves of the spring remain in frictional contact with each other.

33. The combination with a vehicle leaf spring, of a floating shock absorber associated with the end portion of said spring to always engage both the upper and lower surfaces thereof, and means for retaining said floating shock absorber in predetermined relation to said leaf spring and in continuous contact with such upper and lower surfaces.

34. In a shock absorber for vehicles, the combination with side plates, of rollers, means for connecting said plates and holding said rollers in contact with the upper and lower surfaces of said spring, and means for limiting the movement of said rollers along said spring.

In testimony whereof I have signed my name to this specification on this 1st day of June, A. D. 1925.

EARNEST R. SNOOK.